United States Patent
Wang et al.

(10) Patent No.: US 10,116,362 B2
(45) Date of Patent: Oct. 30, 2018

(54) PARAMETRIC GENERATING METHOD FOR ZCZ SEQUENCE SET

(71) Applicant: ZTE Wavetone Science and Technology Ltd., Nanjing, Jiangsu (CN)

(72) Inventors: Haiming Wang, Jiangsu (CN); Yu Wang, Jiangsu (CN); Shiwen He, Jiangsu (CN); Yongming Huang, Jiangsu (CN); Lyuxi Yang, Jiangsu (CN); Jun Zhang, Jiangsu (CN)

(73) Assignee: ZTE Wavetone Science and Technology Ltd., Nanjing, Jiangsu (CN)

( * ) Notice: Subject to any disclaimer, the term of this patent is extended or adjusted under 35 U.S.C. 154(b) by 17 days.

(21) Appl. No.: 15/507,770

(22) PCT Filed: Dec. 29, 2014

(86) PCT No.: PCT/CN2014/095283
§ 371 (c)(1),
(2) Date: Mar. 1, 2017

(87) PCT Pub. No.: WO2016/033908
PCT Pub. Date: Mar. 10, 2016

(65) Prior Publication Data
US 2017/0264348 A1    Sep. 14, 2017

(30) Foreign Application Priority Data

Sep. 3, 2014   (CN) .......................... 2014 1 0447378
Sep. 12, 2014  (CN) .......................... 2014 1 0465443

(51) Int. Cl.
*H04B 7/0456*  (2017.01)
*H04J 13/14*   (2011.01)
(Continued)

(52) U.S. Cl.
CPC ............ *H04B 7/0456* (2013.01); *H04J 13/14* (2013.01); *H04L 25/0204* (2013.01);
(Continued)

(58) Field of Classification Search
CPC ............. H04L 25/0226; H04L 25/0242; H04L 25/0204; H04B 1/711; H04B 7/0456; H04W 84/12
See application file for complete search history.

(56) References Cited

U.S. PATENT DOCUMENTS

2011/0096810 A1* 4/2011 Suehiro ............... H04B 1/7103
                                                  375/130
2013/0003802 A1* 1/2013 Doron ................. H04B 17/345
                                                  375/224

FOREIGN PATENT DOCUMENTS

| CN | 101277125 | 10/2008 |
| CN | 101925191 | 12/2010 |
| CN | 103001723 | 3/2013 |

OTHER PUBLICATIONS

International Search Report of PCT/CN2014/095283 dated May 29, 2015, 4 pages. (English and Chinese).

* cited by examiner

*Primary Examiner* — Chieh M Fan
*Assistant Examiner* — Sung Ahn
(74) *Attorney, Agent, or Firm* — Rankin, Hill & Clark LLP

(57) ABSTRACT

A parametric generating method for a zero correlation zone sequence set, includes: determining a ZCZ sequence set to be generated; determining a limited symbol set; determining an initial non-periodic orthogonal complementary sequence set; constructing a discrete Fourier transformation matrix by using elements in the limited symbol set; constructing a coefficient matrix based on the number of sequences and the (Continued)

number of iterations in the sequence set; using the columns of the coefficient matrix respectively as the coefficients of each sequence in the ZCZ sequence set, iteratively generating ZCZ sequence sets by using a method of zero filling the tails of weighting coefficients; and traversing the coefficient matrix, and selecting a ZCZ sequence set meeting the criteria or an optimal ZCZ sequence set according to requirements.

5 Claims, 4 Drawing Sheets

(51) Int. Cl.
    *H04L 25/02*     (2006.01)
    *H04W 84/12*     (2009.01)
(52) U.S. Cl.
    CPC ...... *H04L 25/0226* (2013.01); *H04L 25/0242* (2013.01); *H04W 84/12* (2013.01)

PARAMETRIC GENERATING METHOD FOR ZCZ SEQUENCE SET

FIELD OF THE INVENTION

The present invention relates to a generation method for a zero correlation zone (ZCZ) sequence set, and belongs to the field of information theory, signal processing and communications technology.

BACKGROUND

With the rapid development of the wireless local access network (WLAN) technology, a variety of WLAN devices, such as smart phones, tablet computers and the like are emerging in large quantities, and people's the requirements on transmission data rates in a variety of indoor wireless networks are increasing day by day. The support for a higher data rate in a future short-range wireless communication system becomes a huge challenge for the existing wireless communication technology. The traditional view is that increasing the bandwidth is considered to be the most direct and most effective means of increasing the transmission data rate.

With the development of the wireless communication technology, represented by the multiple-input and multiple-output (MIMO) technology, how to make the system achieve higher throughput and more reliable transmission by using spatial dimension has become one of the core research contents of enhancing the wireless communication capacity and performance. For a MIMO wireless communication receiver, synchronization and channel estimation are one of the keys to achieve high performance reception. A sequence with ideal correlation properties is used as a pilot sequence, and accurate time synchronization can be achieved by a unique non-zero peak of an ideal correlation sequence; and multipath interference can be eliminated by a zero correlation zone to achieve optimal channel estimation. In addition, the elements of the pilot sequence belong to a limited symbol set, so that the complexity of synchronization and channel estimation of a receiver can be reduced, and a high-speed correlator can be designed conveniently. Theory has proved that a sequence set having ideal autocorrelation and cross-correlation properties at the same time does not exist, therefore it becomes a key point to design a pilot sequence set wherein multiple antennas have autocorrelation and cross-correlation of a zero correlation zone with an enough length, a lower autocorrelation sidelobe and a lower cross-correlation peak, and sequence elements belong to a limited symbol set.

In a ZCZ sequence set, any sequence in the set has autocorrelation properties of a certain length of zero correlation zone, and any different sequences have autocorrelation properties of the same length of zero correlation zone. However, the relation between the sequence length and the number of sequences of the ZCZ sequence set generated in the existing known generation mode is not flexible enough, and the zero correlation zone is relatively short, and different ZCZ sequence sets cannot be designed according to different requirements.

BRIEF DESCRIPTION

Object of the Invention

In view of the problems and shortcomings in the prior art, the present invention provides a parametric generating method for a ZCZ sequence set.

Technical Solution

A parametric generating method for a ZCZ sequence set includes the following steps:

(1) determining a ZCZ sequence set to be generated, wherein the ZCZ sequence set includes the length of a sequence, the number of a sequences and the length of a zero correlation zone;

(2) determining a limited symbol set according to the types of symbols contained in the required sequence;

(3) determining an initial non-periodic orthogonal complementary sequence set according to the ZCZ sequence set to be generated and the limited symbol set;

(4) constructing a discrete Fourier transformation (DFT) matrix by using elements in the limited symbol set based on the size of the ZCZ sequence set;

(5) constructing a unitary matrix by using the elements in the limited symbol set based on the size of the ZCZ sequence set and the number of iterations;

(6) constructing a coefficient matrix composed of any elements in the limited symbol set based on the number of the ZCZ sequence sets and the number of iterations; and (7) using the columns of the coefficient matrix respectively as the coefficients of each sequence in the ZCZ sequence set, finally generating different ZCZ sequence sets by using a method of zero filling the tails of weighted coefficients in two iterative combination modes.

Beneficial Effects the sequence set having autocorrelation and cross-correlation of the zero correlation zone with an enough length, namely, the ZCZ sequence set, is one of the keys applied to a multi-antenna optimal preamble sequence. According to the method for generating the ZCZ sequence set used in the present invention, the length of the zero correlation zone of the generated ZCZ sequence set reaches a theoretical bound, and ZCZ sequence sets of different phases can be generated according to requirements. In addition, the unitary matrix and the coefficient matrix can also be changed in the generation process to randomly or exhaustively search for the optimal ZCZ sequence set having desired properties.

DETAILED DESCRIPTION

The present invention will be further illustrated in combination with the specific embodiments. It should be understood that these embodiments are merely used for illustrating the present invention rather than limiting the scope of the present invention, and after reading the present invention, various equivalent modifications made by those skilled in the art to the present invention shall all fall within the scope defined by the appended claims of the present application.

A parametric generating method for a ZCZ sequence set is provided, and a plurality of sequence sets with more flexible relations between the length of a sequence and the number of sequences in the sets can be generated by the method.

Figure 1:
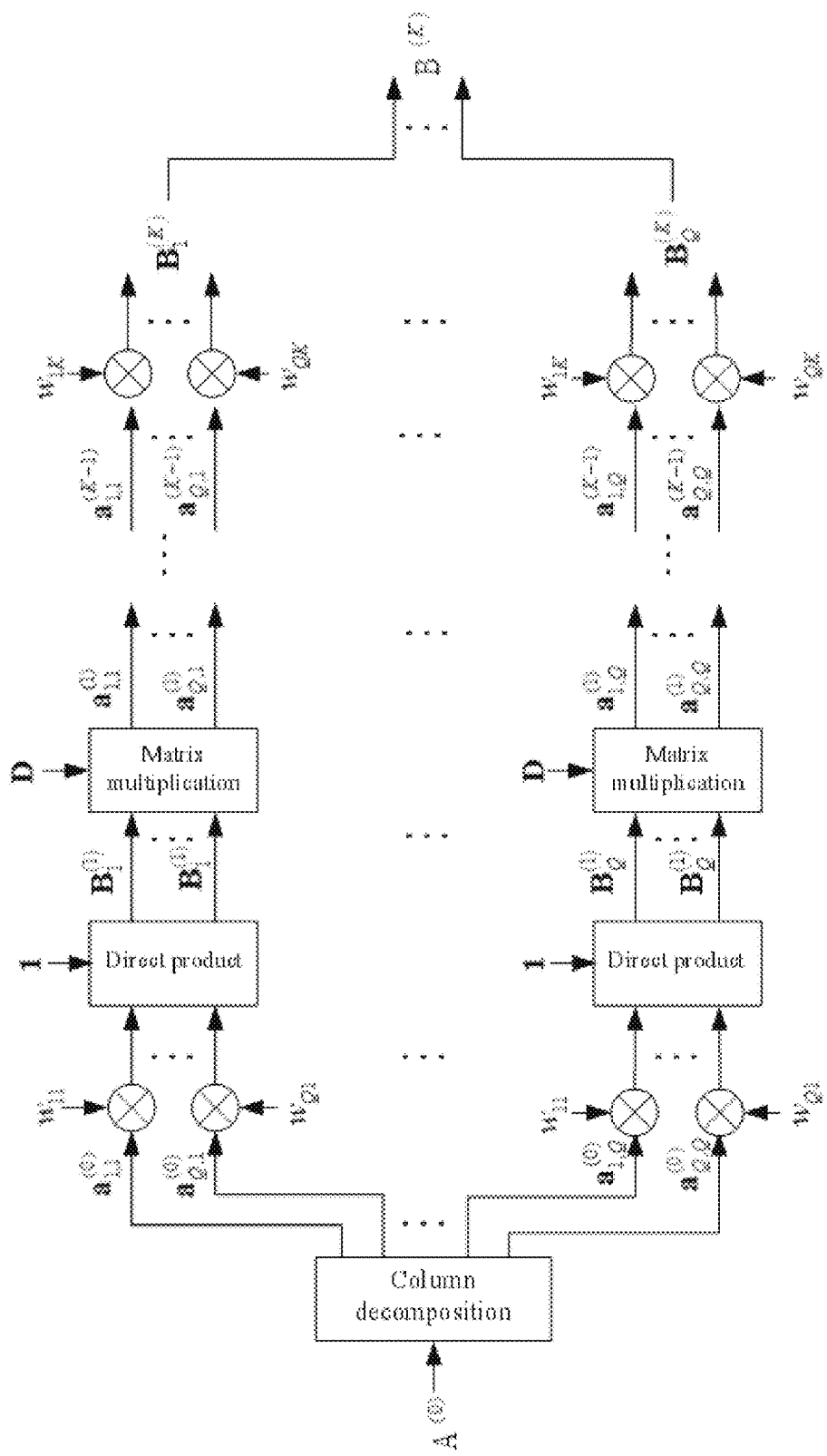
FIG. 1 is a block diagram of generation of a ZCZ sequence set.

As shown in FIG. 1, in the present invention, using a non-periodic orthogonal complementary sequence set as an initial sequence set, the ZCZ sequence set is generated by using a method of zero filling the tails of weighted coefficients. The specific implementation is as follows:

(1) a ZCZ sequence set to be generated is determined as Z(N, Q, Z), wherein N represents the length of a ZCZ sequence, Q represents the number of ZCZ sequences, Z represents the length of a zero correlation zone, and they meet the following relation:

$$N = Q^k L \quad \text{(formula 1)}$$

wherein $K \geq 2$ represents the number of iterations, and L represents an initial sequence length.

(2) A limited symbol set $M = \{e^{j2\pi\theta/Q}\}_{\theta=0}^{Q-1}$ is determined, for example, the limited symbol set is a two-phase $\{+1, -1\}$ in the case of $Q=2$, and is a four-phase $\{+1,-1,+j,-j\}$ in the case of $Q=4$ and the like, wherein j represents an imaginary unit, that is $j^2 = -1$.

(3) The initial sequence length L is determined according to the formula (1), a non-periodic orthogonal complementary sequence set consisting of symbols in the limited symbol set $M=$ and having a length L is generated to serve as an initial sequence set $\tilde{A}^{(0)} = \{\tilde{a}_{p,q}^{(0)}\}_{p,q=1}^Q$, $\tilde{a}_{p,q}^{(0)}$ represents a column vector having the length L in the $p^{th}$ sequence in the $q^{th}$ non-periodic orthogonal complementary sequence set in $\tilde{A}^{(0)}$, which is represented by a matrix as follows:

$$\tilde{A}^{(0)} = \begin{bmatrix} \tilde{a}_{1,1}^{(0)} & \cdots & \tilde{a}_{1,Q}^{(0)} \\ \vdots & \ddots & \vdots \\ \tilde{a}_{Q,1}^{(0)} & \cdots & \tilde{a}_{Q,Q}^{(0)} \end{bmatrix} \quad \text{(formula 2)}$$

wherein $\tilde{A}^{(0)}$ represents a matrix expression form of the set $\tilde{A}^{(0)}$, $\{\tilde{a}_{1,q}^{(0)}, \tilde{a}_{2,q}^{(0)}, \ldots, \tilde{a}_{Q,q}^{(0)}\}$ represents a non-periodic orthogonal complementary sequence set, and $q=1, 2, \ldots, Q$.

(4) A DFT matrix is constructed by using elements in the limited symbol set M according to the size Q of the ZCZ sequence set, wherein the size of the DFT matrix is Q×Q, that is $$F_Q = \begin{bmatrix} f_{1,1} & \cdots & f_{Q,1} \\ \vdots & \ddots & \vdots \\ f_{1,Q} & \cdots & f_{Q,Q} \end{bmatrix} = \begin{bmatrix} 1 & 1 & \cdots & 1 \\ 1 & \omega_Q^1 & \cdots & \omega_Q^{Q-1} \\ \vdots & \vdots & \cdots & \vdots \\ 1 & \omega_Q^{Q-1} & \cdots & \omega_Q^{(Q-1)(Q-1)} \end{bmatrix} \quad \text{(formula 3)}$$

wherein $\omega_Q^{mn} = e^{-j2\pi mn/Q}$.

(5) K−2 Q×Q unitary matrixes $G_Q^{(k)}$, $k=1, 2, \ldots, K-2$ are constructed by using the elements in the limited symbol set M according to the size Q of the sequence set, that is $$G_Q^{(k)} = \begin{bmatrix} g_{1,1}^{(k)} & \cdots & g_{Q,1}^{(k)} \\ \vdots & \ddots & \vdots \\ g_{1,Q}^{(k)} & \cdots & g_{Q,Q}^{(k)} \end{bmatrix} \quad \text{(formula 4)}$$

(6) A Q×K coefficient matrix is constructed by using the elements in the limited symbol set M according to the number Q of the sequence sets and the number K of iterations, and the matrix W is expressed as $$W = \begin{bmatrix} w_{11} & \cdots & w_{1K} \\ \vdots & \ddots & \vdots \\ w_{Q1} & \cdots & w_{QK} \end{bmatrix} \quad \text{(formula 5)}$$

(7) The elements on the $k^{th}$ column of the coefficient matrix W are used as the coefficients of each row of $\tilde{A}^{(k)}$, and the result is represented by $B^{(k)}$, that is $$B^{(k)} = [B_1^{(k)} \cdots B_Q^{(k)}] = \begin{bmatrix} b_{1,1}^{(k)} & \cdots & b_{1,Q}^{(k)} \\ \vdots & \ddots & \vdots \\ b_{Q,1}^{(k)} & \cdots & b_{Q,Q}^{(k)} \end{bmatrix} \quad \text{(formula 6)}$$

$$= \begin{bmatrix} w_{1,k} I_{Q^{k-1}L} & 0_{Q^{k-1}L} & \cdots & 0_{Q^{k-1}L} \\ 0_{Q^{k-1}L} & w_{2,k} I_{Q^{k-1}L} & \cdots & 0_{Q^{k-1}L} \\ \vdots & \vdots & \ddots & \vdots \\ 0_{Q^{k-1}L} & 0_{Q^{k-1}L} & \cdots & w_{Q,k} I_{Q^{k-1}L} \end{bmatrix}$$

$$\begin{bmatrix} \tilde{a}_{1,1}^{(k-1)} & \cdots & \tilde{a}_{1,Q}^{(k-1)} \\ \vdots & \ddots & \vdots \\ \tilde{a}_{Q,1}^{(k-1)} & \cdots & \tilde{a}_{Q,Q}^{(k-1)} \end{bmatrix}$$

wherein the superscript (k) represents the $k^{th}$ iteration, and $B_q^{(k)} = [b_{1,q}^{(k)}, \ldots, b_{Q,q}^{(k)}]^T$, $q=1, \ldots, Q$, $I_L$ and $0_L$ respectively represent a unit matrix with a size L×L and an all-zero matrix.

(8) The non-periodic orthogonal complementary sequence set is generated, that is $$\tilde{A}^{(k)} = D_g \tilde{B}^{(k)} \quad \text{(formula 7)}$$

or $$\tilde{A}^{(k)} = D_f \tilde{B}^{(k)} \quad \text{(formula 8)}$$

wherein $D_g = \text{Diag}(g_{1,1}^{(k)} I_{Q^{k-1}L}, \ldots, g_{1,Q}^{(k)} I_{Q^{k-1}L}, \ldots g_{Q,1}^{(k)} I_{Q^{k-1}L}, \ldots, g_{Q,Q}^{(k)} I_{Q^{k-1}L})$
$D_f = \text{Diag}(f_{1,1} I_{Q^{k-1}L}, \ldots, f_{1,Q} I_{Q^{k-1}L}, \ldots f_{Q,1} I_{Q^{k-1}L}, \ldots, f_{Q,Q} I_{Q^{k-1}L})$, Diag (v) represents generation of a diagonal matrix with elements of the vector v as diagonal elements, $\tilde{B}^{(k)} = 1 \otimes B^{(k)}$, 1 represents a Q-dimensional all-1 column vector, $\otimes$ represents a Kronecker product of the matrix, and $\tilde{A}^{(k)}$ represents the matrix of the non-periodic orthogonal complementary sequence set of the $k^{th}$ iteration.

(9) when K=2, step (11) is executed; when K=3, steps (10) and (11) are executed; or step (13) is executed, when K>3, steps (10) and (11) are executed, or steps (12) and (13) are executed.

(10) $k=1, 2, \ldots, K-2$ is set, and an iterative operation is carried out on steps (7) and (8) by adopting the formula (7) to obtain the matrix $\tilde{A}^{(K-2)}$.

(11) $k=K-1, K$ is set, and the iterative operation is carried out on steps (7) and (8) by adopting the formula (8) to obtain the matrix $B^{(k)}$. The matrix $B^{(k)}$ is the resulting ZCZ sequence set, wherein $\underline{B_q^{(K)}}$, and $q=1, 2, \ldots, Q$ is a ZCZ sequence. The length of the zero correlation zone in the Z(N, Q, Z) is:

$$Z=(Q-1)Q^{K-2}L, K \geq 2 \qquad \text{(formula 9)}.$$

(12) $k=1, 2, \ldots, K-3$ is set, and the iterative operation is carried out on steps (7) and (8) by adopting the formula (7) to obtain the matrix $\tilde{A}^{(K-3)}$.

(13) $k=K-2, K-1, K$ is set, and the iterative operation is carried out on steps (7) and (8) by adopting the formula (8) to obtain the matrix $B^{(K)}$. The matrix $B^{(K)}$ is the resulting ZCZ sequence set, wherein $B^{(K)}$, and $q=1, 2, \ldots, Q$ is a ZCZ sequence. The length of the zero correlation zone in the obtained ZCZ sequence set Z(N, Q, Z) is:

$$Z=[(Q-1)Q+(Q-2)]Q^{K-3}L, K \geq 3 \qquad \text{(formula 10)}.$$

It is set that a Z (128, 4, 28) sequence set is generated, the number K of iterations is 3, the limited symbol set $M=\{+1,+j,-1,-j\}$, j represents the imaginary unit, that is $j^2=-1$. The initial sequence set of the non-periodic orthogonal complementary sequence set is selected as follows:

$$\tilde{A}^{(0)} = \begin{bmatrix} (-1,-1)^T & (-1,+1)^T & (-1,-1)^T & (-1,+1)^T \\ (-1,-1)^T & (-1,+1)^T & (+1,+1)^T & (+1,-1)^T \\ (-1,+1)^T & (-1,-1)^T & (-1,+1)^T & (-1,-1)^T \\ (-1,+1)^T & (-1,-1)^T & (+1,-1)^T & (+1,+1)^T \end{bmatrix} \qquad \text{(formula 11)}$$

The DFT matrix with a size 4×4 is as follows:

$$F_4 = \begin{bmatrix} 1 & 1 & 1 & 1 \\ 1 & j & -1 & -j \\ 1 & -1 & 1 & -1 \\ 1 & -j & -1 & j \end{bmatrix} \qquad \text{(formula 12)}$$

The unitary matrix $G_4^{(1)}$ is as follows:

$$G_4^{(1)} = \begin{bmatrix} 1 & 1 & 1 & 1 \\ 1 & j & -1 & -j \\ 1 & -1 & 1 & -1 \\ 1 & -j & -1 & j \end{bmatrix} \qquad \text{(formula 13)}$$

The coefficient matrix is $$W = \begin{bmatrix} j & j & 1 \\ 1 & -j & -1 \\ -j & -j & 1 \\ -j & j & 1 \end{bmatrix} \qquad \text{(formula 14)}$$

The obtained ZCZ sequence set is as shown in table 1, wherein 0, 1, 2, and 3 respectively represent +1, +j, −1, and −j.

TABLE 1 examples of the ZCZ sequence set (N = 128, Q = 4, K = 3)

| | Z (128, 4, 28) |
|---|---|
| $B_1^{(3)}$ | 00112020222220132211022000220213 |
| | 00112020111130200332002113313320 |
| | 00112020000002312211022022002031 |
| $B_2^{(3)}$ | 00112020333331200033200233113102 |
| | 02132222202022112013002202200011 |
| | 02132222131311000231220013311122 |
| | 02132222020200332013002220022233 |
| $B_3^{(3)}$ | 02132222313133220231220031133300 |
| | 00332002220020312233020200000231 |
| | 00332002113313200011202011111302 |
| | 00332002002202132233020222222013 |
| | 00332002331131020011202033333120 |
| $B_4^{(3)}$ | 02312200200222332031000002020033 |
| | 02312200133111220213222213131100 |
| | 02312200022000112031000020202211 |
| | 02312200311333000213222231313322 |

Table 1 provides the Z (128, 4, 28) sequence set, the maximum sidelobe of normalized periodic autocorrelation is 0.3536, and the maximum peak value of normalized periodic cross-correlation is 0.3536.

Figure 2:
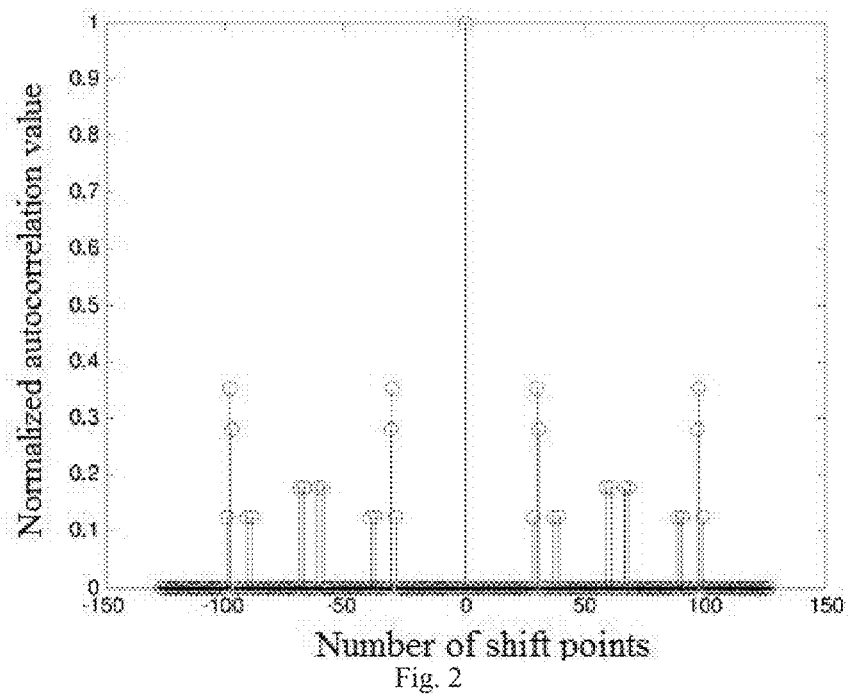
FIG. 2 is a periodic autocorrelation result of a Z (128, 4, 28) sequence set with a maximum sidelobe value.
Figure 3:
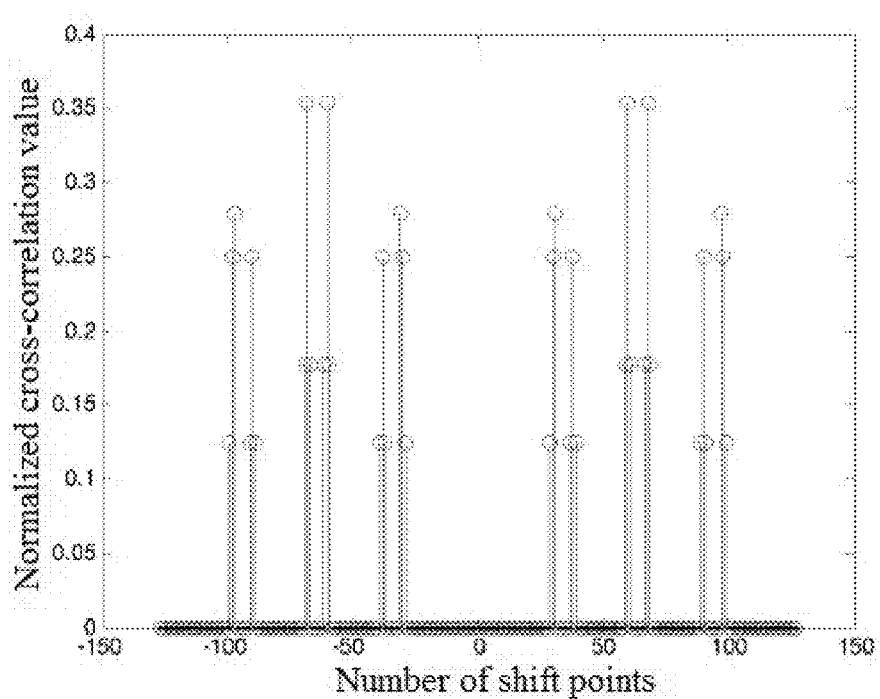
FIG. 3 is a periodic cross-correlation result of a Z (128, 4, 28) sequence set with a maximum peak value.

FIG. 2 provides a periodic autocorrelation result of the sequence set with a maximum sidelobe value, the zero correlation zone is $Z=[(Q-1)Q+(Q-2)]Q^{K-3}L=28$, and the maximum sidelobe of normalized periodic autocorrelation is 0.3536. FIG. 3 provides a periodic cross-correlation result of the sequence set with a maximum peak value, the zero correlation zone is $Z=[(Q-1)Q+(Q-2)]Q^{K-3}L=28$, and the maximum peak value of normalized periodic cross-correlation is 0.3536.

If a Z (256, 4, 56) sequence set needs to be generated, then the number K of iterations is 4, the limited symbol set $M=\{+1,+j,-1,-j\}$. The initial sequence set of the non-periodic orthogonal complementary sequence set is as follows:

$$\tilde{A}^{(0)} = \begin{bmatrix} 1 & 1 & 1 & 1 \\ 1 & j & -1 & -j \\ 1 & -1 & 1 & -1 \\ 1 & -j & -1 & j \end{bmatrix} \qquad \text{(formula 1)}$$

The DFT matrix with the size 4×4 is as follows:

$$F_4 = \begin{bmatrix} 1 & 1 & 1 & 1 \\ 1 & j & -1 & -j \\ 1 & -1 & 1 & -1 \\ 1 & -j & -1 & j \end{bmatrix} \qquad \text{(formula 2)}$$

The unitary matrix $G_4^{(k)}$, k=1, 2 is as follows:

$$G_4^{(k)} = \begin{bmatrix} 1 & 1 & 1 & 1 \\ 1 & j & -1 & -j \\ 1 & -1 & 1 & -1 \\ 1 & -j & -1 & j \end{bmatrix}, k = 1, 2. \qquad \text{(formula 3)}$$

The coefficient matrix is $$W = \begin{bmatrix} 1 & -1 & -j & -j \\ -1 & j & -j & -j \\ -j & -1 & -j & 1 \\ j & -j & -1 & j \end{bmatrix}.$$  (formula 4)

Figure 4:
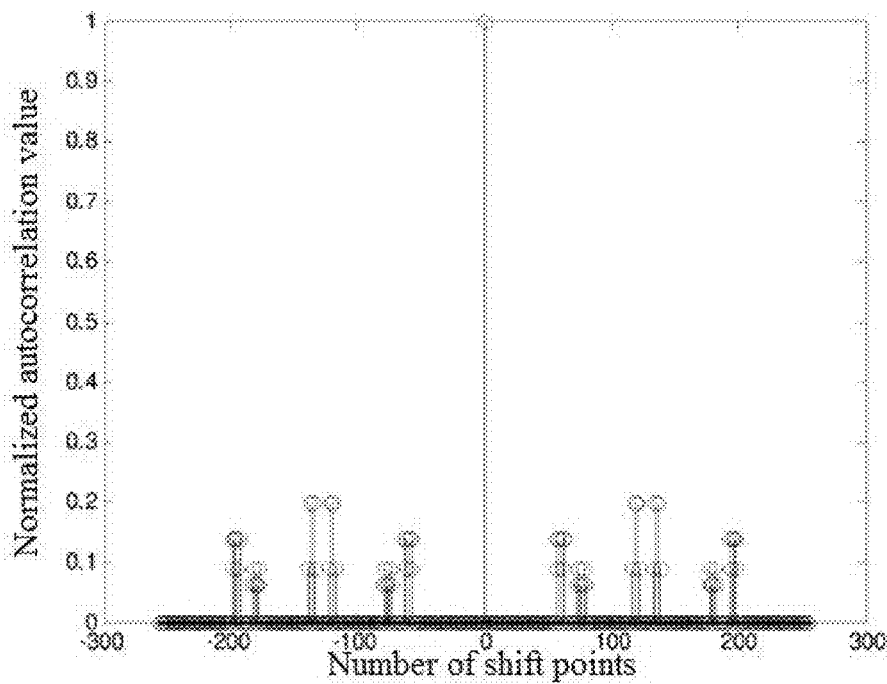
FIG. 4 is a periodic autocorrelation result of a Z (256, 4, 56) sequence set with a maximum sidelobe value.

FIG. 4 provides a periodic autocorrelation result of the Z (256, 4, 56) sequence set, with a maximum sidelobe value, the zero correlation zone is $Z=[(Q-1)Q+(Q-2)]Q^{K-3}L=56$, and the maximum sidelobe of normalized periodic autocorrelation is 0.1976.

Figure 5:
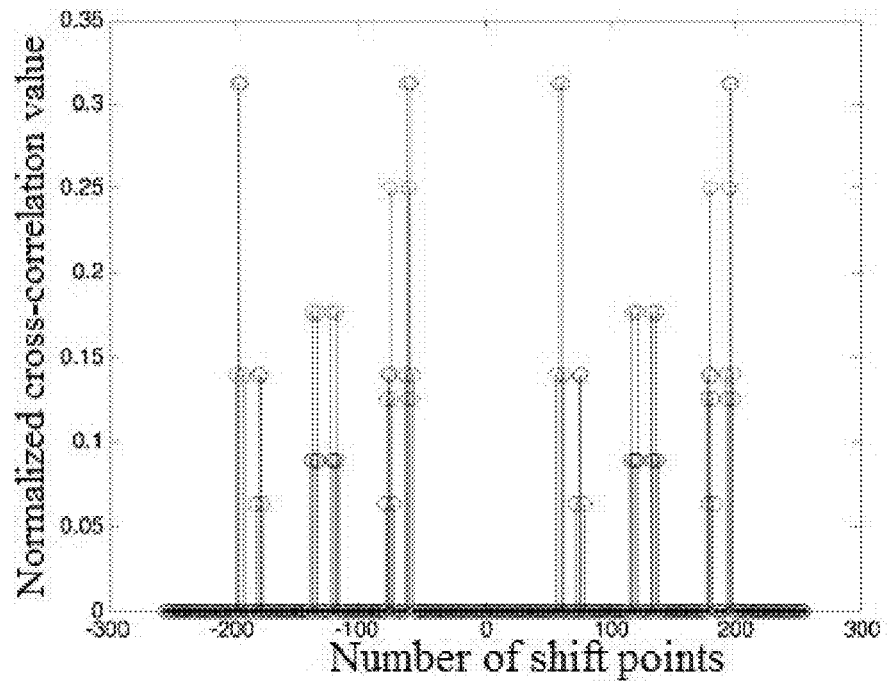
FIG. 5 is a periodic cross-correlation result of a Z (256, 4, 56) sequence set with a maximum peak value.

FIG. 5 provides a periodic cross-correlation result of the Z (256, 4, 56) sequence set with a maximum peak value, the zero correlation zone is $Z=[(Q-1)Q+(Q-2)]Q^{K-3}L=56$, and the maximum peak value of normalized periodic cross-correlation is 0.3125.

If a Z (512, 4, 112) sequence set needs to be generated, then the number K of iterations is 4, the limited symbol set $M=\{+1,+j,-1,-j\}$, and the initial sequence set of the non-periodic orthogonal complementary sequence set is as follows:

$$\tilde{A}^{(0)} = \begin{bmatrix} (-1,-1)^T & (-1,+1)^T & (-1,-1)^T & (-1,+1)^T \\ (-1,-1)^T & (-1,+1)^T & (+1,+1)^T & (+1,-1)^T \\ (-1,+1)^T & (-1,-1)^T & (-1,+1)^T & (-1,-1)^T \\ (-1,+1)^T & (-1,-1)^T & (+1,-1)^T & (+1,+1)^T \end{bmatrix}.$$  (formula 5)

The DFT matrix with the size 4×4 is as follows:

$$F_4 = \begin{bmatrix} 1 & 1 & 1 & 1 \\ 1 & j & -1 & -j \\ 1 & -1 & 1 & -1 \\ 1 & -j & -1 & j \end{bmatrix}.$$  (formula 6)

The unitary matrix $G_4^{(k)}$, k=1, 2 is as follows:

$$G_4^{(k)} = \begin{bmatrix} 1 & 1 & 1 & 1 \\ 1 & j & -1 & -j \\ 1 & -1 & 1 & -1 \\ 1 & -j & -1 & j \end{bmatrix}, k=1,2.$$  (formula 7)

The coefficient matrix is $$W = \begin{bmatrix} 1 & -j & -j & -j \\ j & -j & j & -j \\ j & j & -j & -1 \\ -j & -j & 1 & -j \end{bmatrix}.$$  (formula 8)

Figure 6:
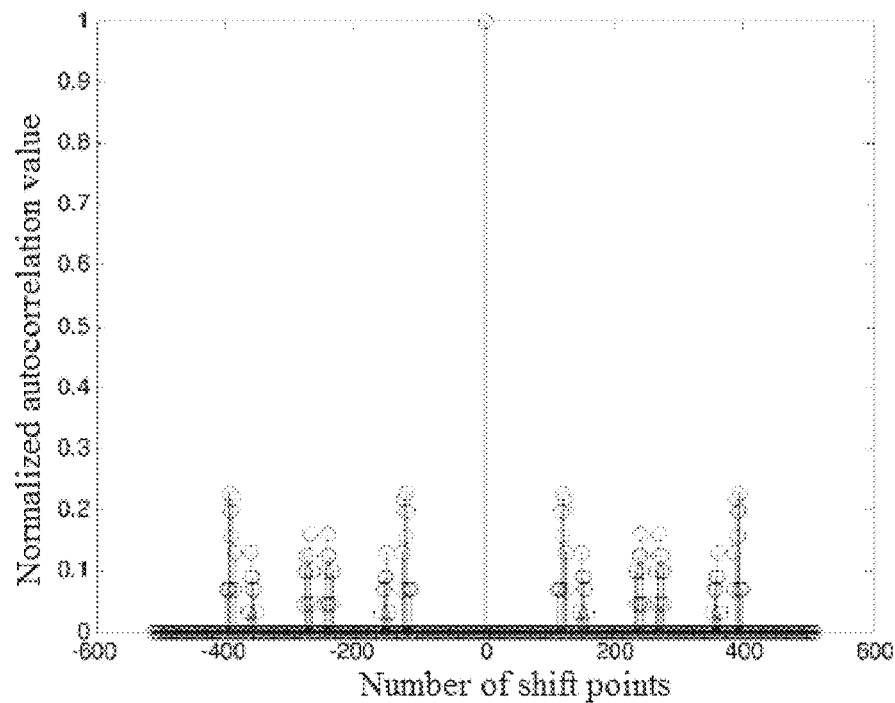
FIG. 6 is a periodic autocorrelation result of a Z (512, 4, 112) sequence set with a maximum sidelobe value.

FIG. 6 provides a periodic autocorrelation result of the Z (512, 4, 112) sequence set with a maximum sidelobe value, the zero correlation zone is $Z=[(Q-1)Q+(Q-2)]Q^{K-3}L=112$, and the maximum sidelobe of normalized periodic autocorrelation is 0.2275.

Figure 7:
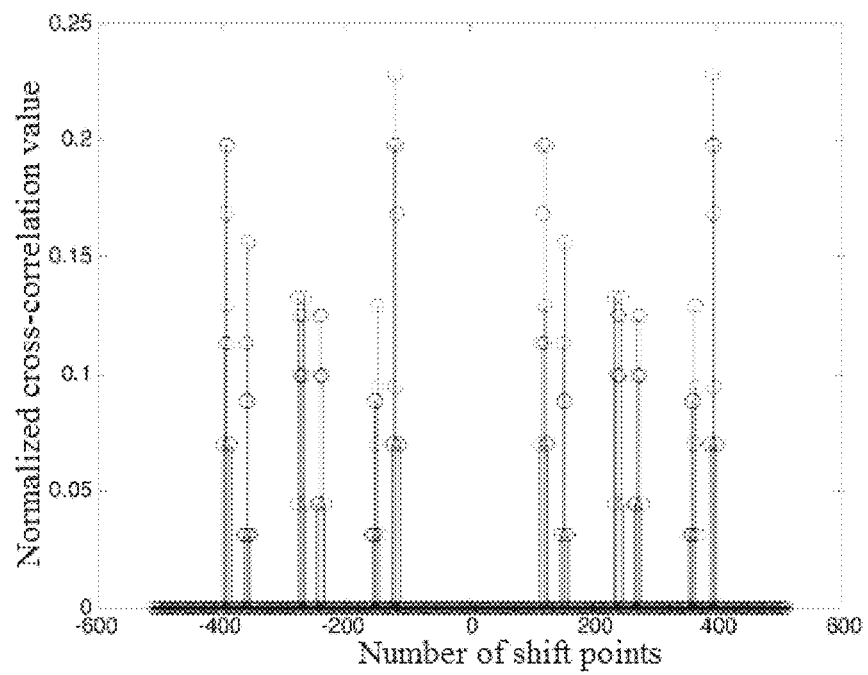
FIG. 7 is a periodic cross-correlation result of a Z (512, 4, 112) sequence set with a maximum peak value.

FIG. 7 provides a periodic cross-correlation result of the Z (512, 4, 112) sequence set with a maximum peak value, the zero correlation zone is $Z=[(Q-1)Q+(Q-2)]Q^{K-3}L=112$, and the maximum peak value of normalized periodic cross-correlation is 0.2275.

The present invention provides a Z (N, Q, Z) sequence set generation method, sequence sets with more flexible relations between the length N of a sequence and the number Q of sequences in the sets can be generated by the method, namely it is required that $N=Q^KL$ is satisfied, the zero correlation zone in the first iterative combination of the ZCZ sequence set is $Z=(Q-1)Q^{K-2}L$, K≥2, the zero correlation zone in the second iterative combination is $Z=[(Q-1)Q+(Q-2)]Q^{K-3}L$, K≥3, and the sequence elements belong to the characteristics of the limited symbol set; and moreover, different unitary matrixes can be selected for each iteration step, and the coefficients are randomly or exhaustively transversed to obtain the ZCZ sequence set having specific properties.

The invention claimed is:

1. A parametric generating method for a ZCZ sequence set, comprising the following steps:
    (1) determining a zero correlation zone (ZCZ) sequence set to be generated, wherein the ZCZ sequence set to be generated is determined as Z(N, Q, Z), N represents a length of the ZCZ sequence, Q represents a number of the ZCZ sequences, Z represents a length of a zero correlation zone, and they meet the following relation:

$N=Q^KL$ (formula 1)

wherein K≥2 represents a number of iterations, and L represents an initial sequence length;
    (2) determining a limited symbol set according to the types of symbols contained in the ZCZ sequence;
    (3) determining an initial non-periodic orthogonal complementary sequence set according to the ZCZ sequence set to be generated and the limited symbol set;
    (4) constructing a discrete Fourier transformation (DFT) matrix by using elements in the limited symbol set based on the size of the ZCZ sequence set;
    (5) constructing a unitary matrix by using the elements in the limited symbol set based on the size of the ZCZ sequence set and the number of iterations;
    (6) constructing a coefficient matrix composed of any elements in the limited symbol set based on the number of the ZCZ sequence sets and the number of iterations; and
    (7) using the columns of the coefficient matrix respectively as the coefficients of each sequence in the ZCZ sequence set, finally generating different ZCZ sequence sets by using a method of zero filling the tails of weighted coefficients in two iterative combination modes.

2. The parametric generating method for the ZCZ sequence set of claim 1, wherein
    in step 2, the limited symbol set $M=\{e^{j2\pi\theta/Q}\}_{\theta=0}^{Q-1}$ is determined.

3. The parametric generating method for the ZCZ sequence set of claim 2, wherein the initial sequence length L is determined, a non-periodic orthogonal complementary sequence set consisting of symbols in the limited symbol set M= and having a length L is generated to serve as an initial sequence set $\tilde{A}^{(0)}=\{\tilde{a}_{p,q}^{(0)}\}_{p,q=1}^Q$, which is represented by a matrix as follows:

$$\tilde{A}^{(0)} = \begin{bmatrix} \tilde{a}_{1,1}^{(0)} & \cdots & \tilde{a}_{1,Q}^{(0)} \\ \vdots & \ddots & \vdots \\ \tilde{a}_{Q,1}^{(0)} & \cdots & \tilde{a}_{Q,Q}^{(0)} \end{bmatrix} \quad \text{(formula 2)}$$

wherein $\tilde{A}^{(0)}$ represents a matrix expression form of the set $\tilde{A}^{(0)}$, and $\{\tilde{a}_{1,q}^{(0)}, \tilde{a}_{2,q}^{(0)}, \ldots, \tilde{a}_{Q,q}^{(0)}\}$ represents a non-periodic orthogonal complementary sequence set, and $q=1, 2, \ldots, Q$;

the DFT matrix is constructed by using the elements in the limited symbol set M according to the size Q of the sequence set, wherein the size of the DFT matrix is Q×Q, that is $$F_Q = \begin{bmatrix} f_{1,1} & \cdots & f_{Q,1} \\ \vdots & \ddots & \vdots \\ f_{1,Q} & \cdots & f_{Q,Q} \end{bmatrix} = \begin{bmatrix} 1 & 1 & \cdots & 1 \\ 1 & \omega_Q^1 & \cdots & \omega_Q^{Q-1} \\ \vdots & \vdots & \cdots & \vdots \\ 1 & \omega_Q^{Q-1} & \cdots & \omega_Q^{(Q-1)(Q-1)} \end{bmatrix} \quad \text{(formula 3)}$$

wherein $\omega_Q^{mn} = e^{-j2\pi mn/Q}$;

K−2 Q×Q unitary matrices $G_Q^{(k)}$, $k=1, 2, \ldots, K-2$ are constructed by using the elements in the limited symbol set M according to the size Q of the sequence set, that is $$G_Q^{(k)} = \begin{bmatrix} g_{1,1}^{(k)} & \cdots & g_{Q,1}^{(k)} \\ \vdots & \ddots & \vdots \\ g_{1,Q}^{(k)} & \cdots & g_{Q,Q}^{(k)} \end{bmatrix} \quad \text{(formula 4)}$$

a Q×K coefficient matrix W is constructed by using the elements in the limited symbol set M according to the number Q of the sequence sets and the number K of iterations, and the matrix W is expressed as $$W = \begin{bmatrix} w_{1,1} & \cdots & w_{1,K} \\ \vdots & \ddots & \vdots \\ w_{Q,1} & \cdots & w_{Q,K} \end{bmatrix}. \quad \text{(formula 5)}$$

4. The parametric generating method for the ZCZ sequence set of claim 3, wherein (41) the elements on the $k^{th}$ column of the coefficient matrix W are used as the coefficients of each row of $\tilde{A}^{(k)}$, and the result is represented by $B^{(k)}$, that is $$B^{(k)} = \begin{bmatrix} B_1^{(k)} & \cdots & B_Q^{(k)} \end{bmatrix} = \begin{bmatrix} b_{1,1}^{(k)} & \cdots & b_{1,Q}^{(k)} \\ \vdots & \ddots & \vdots \\ b_{Q,1}^{(k)} & \cdots & b_{Q,Q}^{(k)} \end{bmatrix} \quad \text{(formula 6)}$$

$$= \begin{bmatrix} w_{1,k}I_{Q^{k-1}L} & 0_{Q^{k-1}L} & \cdots & 0_{Q^{k-1}L} \\ 0_{Q^{k-1}L} & w_{2,k}I_{Q^{k-1}L} & \cdots & 0_{Q^{k-1}L} \\ \vdots & \vdots & \ddots & \vdots \\ 0_{Q^{k-1}L} & 0_{Q^{k-1}L} & \cdots & w_{Q,k}I_{Q^{k-1}L} \end{bmatrix} \begin{bmatrix} \tilde{a}_{1,1}^{(k-1)} & \cdots & \tilde{a}_{1,Q}^{(k-1)} \\ \vdots & \ddots & \vdots \\ \tilde{a}_{Q,1}^{(k-1)} & \cdots & \tilde{a}_{Q,Q}^{(k-1)} \end{bmatrix}$$

wherein the superscript (k) represents the $k^{th}$ iteration, and $B_q^{(k)} = [b_{1,q}^{(k)}, \ldots, b_{Q,q}^{(k)}]^T$, $q=1, \ldots, Q$, $I_L$ and $0_L$ respectively represent a unit matrix with a size L×L and an all-zero matrix; and (42) the non-periodic orthogonal complementary sequence set is generated, that is $$\tilde{A}^{(k)} = D_g \tilde{B}^{(k)} \quad \text{(formula 7)}$$

or $$\tilde{A}^{(k)} = D_f \tilde{B}^{(k)} \quad \text{(formula 8)}$$

wherein $D_g = \text{Diag}(g_{1,1}^{(k)}I_{Q^{k-1}L}, \ldots, g_{1,Q}^{(k)}I_{Q^{k-1}L}, \ldots g_{Q,1}^{(k)}I_{Q^{k-1}L}, \ldots, g_{Q,Q}^{(k)}I_{Q^{k-1}L})$
$D_f = \text{Diag}(f_{1,1}I_{Q^{k-1}L}, \ldots, f_{1,Q}I_{Q^{k-1}L}, \ldots g_{Q,1}I_{Q^{k-1}L}, \ldots, f_{Q,Q}I_{Q^{k-1}L})$, Diag(v) represents generation of a diagonal matrix with elements of the vector v as diagonal elements, $\tilde{B}^{(k)} = 1 \otimes B^{(k)}$, 1 represents a Q-dimensional all-1 column vector, $\otimes$ represents a Kronecker product of the matrix, and $\tilde{A}^{(k)}$ represents the matrix of the non-periodic orthogonal complementary sequence set of the $k^{th}$ iteration.

5. The parametric generating method for the ZCZ sequence set of claim 4, wherein
when K=2, step (511) is executed; when K=3, steps (510) and (511) are executed; or step (513) is executed, when K>3, steps (510) and (511) are executed, or steps (512) and (513) are executed;

(510) $k=1, 2, \ldots, K-2$ is set, and an iterative operation is carried out on steps (41) and (42) by adopting the formula (7) to obtain the matrix $\tilde{A}^{(K-2)}$;

(511) $k=K-1$, K is set, and the iterative operation is carried out on steps (41) and (42) by adopting the formula (8) to obtain the matrix $B^{(K)}$; the matrix $B^{(K)}$ is the resulting ZCZ sequence set, wherein $B_q^{(K)}$, $q=1, 2, \ldots, Q$, and Q is a ZCZ sequence; the length of the zero correlation zone in the Z(N, Q, Z) is:

$$Z=(Q-1)Q^{K-2}L, K \geq 2 \quad \text{(formula 9)};$$

(512) $k=1, 2, \ldots, K-3$ is set, and the iterative operation is carried out on steps (41) and (42) by adopting the formula (7) to obtain the matrix $\tilde{A}^{(K-3)}$; and (513) $k=K-2, K-1, K$ is set, and the iterative operation is carried out on steps (41) and (42) by adopting the formula (8) to obtain the matrix $B^{(K)}$; the matrix $B^{(K)}$ is the resulting ZCZ sequence set; and similarly, the length of the zero correlation zone in the obtained ZCZ sequence set Z(N, Q, Z) is:

$$Z=[(Q-1)Q+(Q-2)]Q^{K-3}L, K \geq 3 \quad \text{(formula 10)}.$$

* * * * *